R. E. ROSEBERRY.
BABBITTING JIG FOR ENGINE CRANK SHAFT BEARINGS.
APPLICATION FILED JUNE 6, 1919.

1,358,578.

Patented Nov. 9, 1920.
2 SHEETS—SHEET 1.

Inventor
Robert E. Roseberry

By Whittemore Hulbert & Whittemore
Attorneys

R. E. ROSEBERRY.
BABBITTING JIG FOR ENGINE CRANK SHAFT BEARINGS.
APPLICATION FILED JUNE 6, 1919.

1,358,578.

Patented Nov. 9, 1920.
2 SHEETS—SHEET 2.

Inventor
Robert E. Roseberry

By Whittemore, Hulbert & Whittemore
Attorneys

UNITED STATES PATENT OFFICE.

ROBERT E. ROSEBERRY, OF DETROIT, MICHIGAN.

BABBITTING-JIG FOR ENGINE-CRANK-SHAFT BEARINGS.

1,358,578.   Specification of Letters Patent.   Patented Nov. 9, 1920.

Application filed June 6, 1919. Serial No. 302,212.

*To all whom it may concern:*

Be it known that I, ROBERT E. ROSEBERRY, a citizen of the United States of America, residing at Detroit, in the county of Wayne and State of Michigan, have invented certain new and useful Improvements in Babbitting-Jigs for Engine-Crank-Shaft Bearings, of which the following is a specification, reference being had therein to the accompanying drawings.

The invention relates to jigs for babbitting the bearings of engine crank shafts and the invention consists in the novel construction as hereinafter set forth.

My improvement is designed for use in babbitting the bearings of engines for automobiles and tractors and particularly is designed for use on engines for Ford cars and Fordson tractors.

Figure 1:
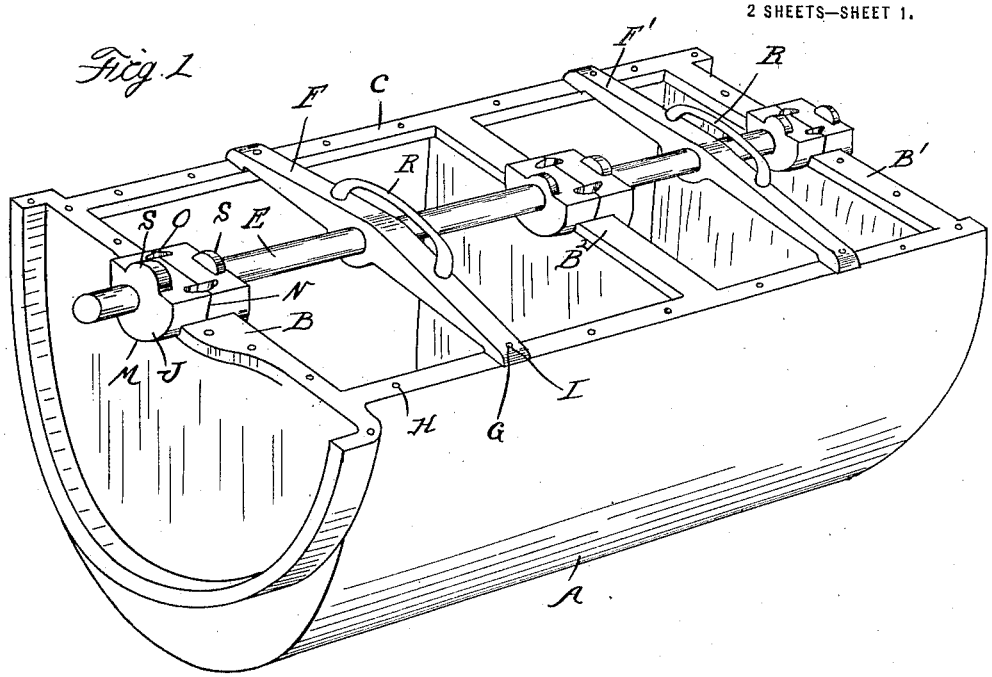
Figure 1 is a perspective view of an engine casing showing the jig in engagement therewith for babbitting the bearings thereof.

As shown in Fig. 1, A is the inverted upper portion of the crank casing for a Fordson tractor which is provided with bearings B and B' upon the opposite end walls thereof and a central bearing B² on a division wall. The bottom face C of the casing is machined for engagement with the pan or lower portion of the crank casing, and there are also machined faces at opposite ends of each bearing, as indicated at D and D' in Fig. 2.

My improved babbitting jig comprises a shaft member E corresponding in diameter to the crank shaft but being straight from end to end; also a pair of cross bars F and F', which are centrally bored to receive the shaft and which at their opposite ends have bearing faces for engaging the machined face C of the casing A. The shaft is exactly centered with respect to the casing A by pins I which engage apertures G in the ends of the bars F and bolt holes H in the casing A. As these bolt holes are drilled in jigs they are exactly positioned, so that when the cross bars are registered therewith and secured by the pins I the shaft is accurately alined.

The bearing molds are formed of complementary sections J which embrace the opposite ends of the bearings and abut against each other in the transverse central plane thereof. These mold members have segmental bearings K which exactly fit and are slidable upon the upper portion of the shaft T, also lower faces L for bearing upon the machined face C of the casing and end flanges M for bearing against the machined end surfaces D and D' of the bearings. The inner ends N of the mold sections abut against each other when the flanges M are bearing against the faces D and D'. Thus a completely inclosed mold cavity is formed, the inner face of which is formed by the shaft E, the ends by the inner faces of the flanges M and the top by the faces L. There are, however, provided sprues for the pouring in of the molten metal, these being formed in the complementary portions of the mold, as indicated at O. The sprue openings are of tapering form with the smallest area at their inner ends so as to facilitate the cutting off of the sprue.

Figure 2:
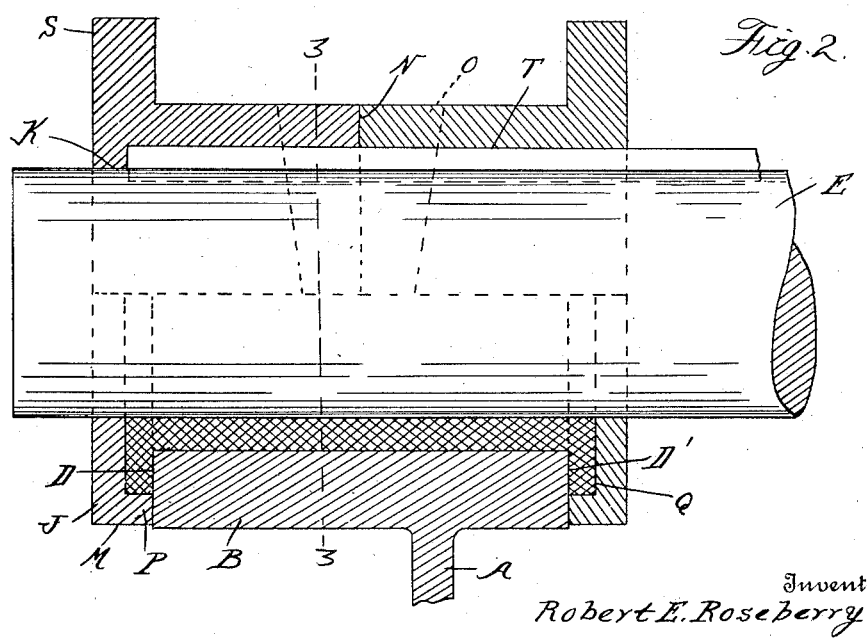
Fig. 2 is a longitudinal section through one of the bearings.
Figure 3:
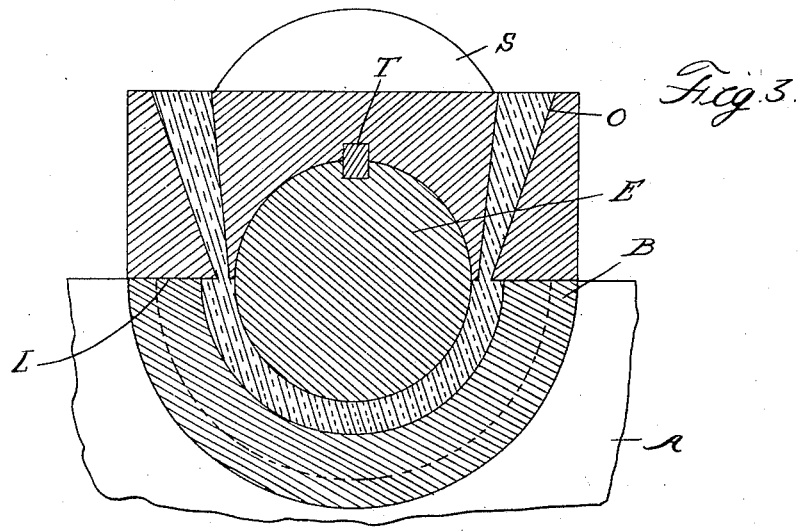
Fig. 3 is a cross-section in the metering plane of the complementary mold members of the jig on line 3—3 of Fig. 2.
Figure 4:
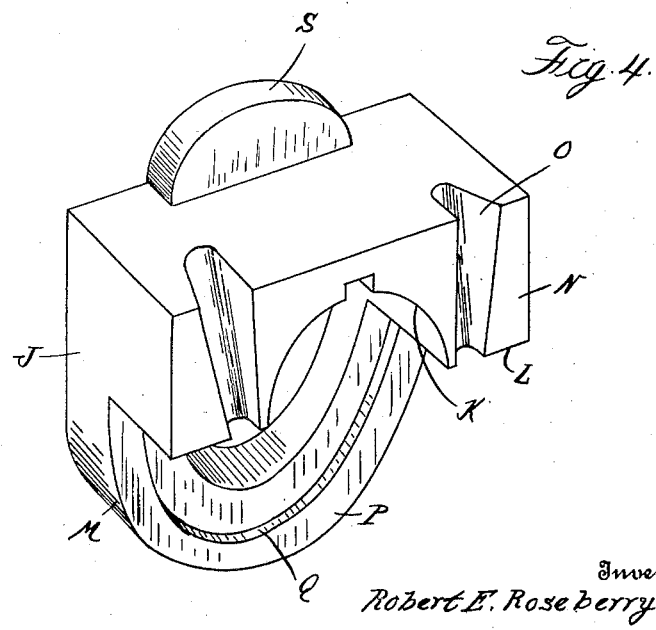
Fig. 4 is a perspective view of one of the mold members.

One or more of the bearings is provided with babbitting end thrust faces and, as shown in Fig. 2, these faces are produced by providing inwardly extending segmental flanges P on the flanges M, leaving spaces O within the mold for forming the end thrust bearings.

In use, the jig is placed upon the casing to be babbitted, the handles R being preferably provided on the cross bars F for convenience in handling. The complementary bearing sections are then slid upon the shaft E into engagement with each other and with the machined ends of the bearing, after which the molten metal is poured through the sprues O. The complementary sections are then forced apart by driving them oppositely upon the shaft, and to facilitate this operation driving lugs S are formed on the upper portion of each section. The sprues O taper outwardly in horizontal section so that the mold sections may be readily disengaged therefrom and after the jig is removed the sprues can be chipped off, leaving the completed babbitted bearing.

The construction has the advantages, first, that the jig may be quickly set up; second, that it is alined with absolute accuracy; third, that the molten metal can be conveniently poured in the molds; and fourth, that the mold sections can be readily disengaged from the casing and the jig removed.

To hold the complementary mold sections J from rotative displacement on the shaft E the latter is preferably provided with a key T engaging the corresponding key-way in said complementary sections.

What I claim as my invention is:—

1. In a babbitting jig for shaft bearings, the combination of a shaft, means for accurately positioning and alining said shaft with respect to the bearing frame, and a mold formed of complementary sections slidable upon said shaft to embrace the bearing seat, and having faces abutting when said sections engage said seat.

2. In a babbitting jig for shaft bearings, the combination with a shaft, of means for accurately positioning and alining said shaft with respect to the bearing frame, and a bearing mold formed of complementary sections longitudinally slidable upon said shaft, each section being provided with a face for abutting against the face of the complementary section, a flange forming the end of the mold cavity and bearing against the end of the bearing seat, and a face forming the top of the mold cavity and sealing against the mold seat.

3. In a babbitting jig, the combination with a shaft and means for accurately positioning and alining the same, of a bearing mold formed of complementary sections, each section having a segmental recess for fitting the shaft, an inner transverse face for abutting against the corresponding face of the complementary section, a horizontally extending face forming the top of the mold cavity and sealing against the bearing seat, and an end flange for bearing against the end of the bearing seat.

4. In a babbitting jig, the combination with a shaft, of means for accurately positioning and alining the shaft with respect to the frame carrying the bearing seat, and a bearing mold formed of complementary sections having faces for sealing the mold cavity and abutting against each other, and a sprue channel formed in one or more of said sections adjacent to the inner end thereof.

5. In a babbitting jig, the combination with a shaft, of means for accurately positioning and alining said shaft with respect to the frame carrying the bearing seat, and a bearing mold formed of complementary sections slidable upon said shaft to embrace the bearing seat, one or more of said sections having a sprue channel therein from which said section may be disengaged by an outward movement.

6. In a babbitting jig, the combination with a shaft, of means for accurately positioning and alining said shaft with respect to the member carrying the bearing seat, and a bearing mold formed of complementary sections having abutting faces with a sprue opening formed in one or more of said sections extending to and flaring toward said abutting face.

7. In a babbitting jig, the combination with a shaft and means for positioning the same with respect to the bearing seat, of a mold formed of complementary sections embracing said seat and forming sealing contact therewith, said sections having abutting faces, and one or more sprue openings formed in the complementary mold sections permitting of the lateral disengagement of said sections from the sprue.

8. A babbitting jig, comprising a shaft member, a supporting member for said shaft spanning the space between machined portions of the member carrying the bearing seat, and means engaging said supporting member and exactly positioned shoulders on said machined face for accurately alining said shaft.

9. A babbitting jig for engine crank shafts, comprising a shaft for extending through the bearing seats, cross bars slidable upon said shaft having end portions for bearing upon the machined faces on opposite sides of the crank case, and means engaging said cross bars and accurately positioned apertures in said machined faces for accurately alining said shaft.

10. A babbitting jig for engine crank casings, comprising a shaft extending through the bearing seats, cross bars slidable upon said shaft and having their end portions engaging machined faces on the crank casing, fins engaging apertures in said cross bars and accurately positioned apertures in said machined faces for alining said shaft, and bearing molds formed in complementary sections slidable upon said shaft and embracing the bearing seats.

11. In a babbitting jig, the combination with a shaft, of a bearing mold comprising complementary sections slidably engaging the shaft to embrace the bearing seat, each section of said mold having a top portion grooved to fit the shaft with horizontal surfaces projecting laterally therefrom on opposite sides, a downwardly projecting end flange overlapping the end of the groove to form a mold cavity for an end thrust bearing with a peripheral flange surrounding said cavity contacting with the mold seat, and a sprue channel formed in said section opening to the inner face thereof.

12. In a babbitting jig for shaft bearings, the combination of a shaft, means for accurately positioning and alining said shaft with respect to the bearing frame, and a mold formed of complementary sections slidable upon said shaft to embrace the bearing seat, and jointly formed with a sprue opening.

In testimony whereof I affix my signature.

ROBERT E. ROSEBERRY.